United States Patent
Zhao et al.

(10) Patent No.: US 10,107,390 B2
(45) Date of Patent: *Oct. 23, 2018

(54) TORQUE CONVERTER CLUTCH ENGAGEMENT PRESSURE

(71) Applicant: Ford Global Technologies, LLC, Dearborn, MI (US)

(72) Inventors: Yanan Zhao, Ann Arbor, MI (US); Bernard D. Nefcy, Novi, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/258,541

(22) Filed: Sep. 7, 2016

(65) Prior Publication Data
US 2018/0066753 A1    Mar. 8, 2018

(51) Int. Cl.
| | |
|---|---|
| *F16H 61/14* | (2006.01) |
| *B60K 6/38* | (2007.10) |
| *B60L 7/16* | (2006.01) |
| *B60W 10/02* | (2006.01) |
| *B60W 20/00* | (2016.01) |

(52) U.S. Cl.
CPC .............. *F16H 61/143* (2013.01); *B60K 6/38* (2013.01); *B60L 7/16* (2013.01); *B60W 10/026* (2013.01); *B60W 20/00* (2013.01); *B60Y 2300/18125* (2013.01)

(58) Field of Classification Search
CPC ...... B60W 20/00; B60W 20/50; B60W 30/18; B60W 10/02; B60W 20/40; B60W 20/206; B60K 6/38; B60L 7/16; F16H 61/143
See application file for complete search history.

(56) References Cited

U.S. PATENT DOCUMENTS

| | | | |
|---|---|---|---|
| 8,070,647 B2 | 12/2011 | Heap | |
| 8,606,483 B2 | 12/2013 | Krupadanam et al. | |
| 8,855,844 B2 | 10/2014 | Schwindt | |
| 9,187,081 B2 | 11/2015 | Dai et al. | |
| 9,352,744 B2 * | 5/2016 | Zhao | B60L 7/18 |
| 9,475,495 B2 * | 10/2016 | Nefcy | B60W 30/18127 |
| 9,598,085 B2 * | 3/2017 | Nefcy | B60W 30/18127 |
| 9,610,940 B2 * | 4/2017 | Ortmann | B60W 20/40 |
| 9,738,268 B1 * | 8/2017 | Zhang | B60W 20/13 |

(Continued)

FOREIGN PATENT DOCUMENTS

EP    2743151 A1    6/2014

OTHER PUBLICATIONS

Baraszu et al., Torque fill-in for an automated shift manual transmission in a parallel hybrid electric vehicle, 2002, IEEE, p. 1431-1436.*

Jinfang et al., The coordinated control of motor regenerative braking torques defined by accelerator pedal and brake pedal of electric vehicle, 2012, IEEE, p. 119-123.*

Yu et al., Regenerative braking torque estimation and control approaches for a hybrid electric truck, 2010, IEEE, p. 5832-5837.*

(Continued)

*Primary Examiner* — McDieunel Marc
(74) *Attorney, Agent, or Firm* — Brooks Kushman P.C.

(57) ABSTRACT

A vehicle may include a controller configured to, in response to an accelerator pedal release and an expected regenerative braking event, increase an engagement pressure of a torque converter clutch prior to occurrence of the event to a threshold that is based on a regenerative braking torque estimate associated with the event such that during the event, the clutch transfers more torque than the converter.

20 Claims, 7 Drawing Sheets

(56) References Cited

U.S. PATENT DOCUMENTS

| | | | |
|---|---|---|---|
| 2010/0036575 A1* | 2/2010 | Yurgil | B60L 7/26 701/70 |
| 2015/0019058 A1 | 1/2015 | Georgiev | |
| 2015/0202964 A1* | 7/2015 | Nefcy | B60L 7/18 701/70 |
| 2015/0203106 A1* | 7/2015 | Zhao | B60L 7/18 701/22 |
| 2015/0251657 A1 | 9/2015 | Johri et al. | |
| 2015/0291171 A1 | 10/2015 | Kuroki et al. | |
| 2016/0009274 A1 | 1/2016 | Gibson et al. | |
| 2016/0375893 A1* | 12/2016 | Nefcy | B60W 20/14 701/22 |
| 2017/0015308 A1* | 1/2017 | Ortmann | B60W 20/40 |

OTHER PUBLICATIONS

Feng et al., Regenerative braking algorithm for a parallel hybrid electric vehicle with continuously variable transmission, 2007, IEEE, p. 1-4.*

Sahlholm, Segmented road grade estimation for fuel efficient heavy duty vehicles, 2010, IEEE, p. 1045-1050 (Year: 2010).*

Pandita et al., Preceding Vehicle State Prediction, 2013, IEEE, p. 1000-1006.*

Amari et al., Experimental evaluation of a hybrid MPC strategy for vehicle start-up with an Automated Manual Transmission, 2009, IEEE, p. 4271-4277.*

Baraszu et al., Torque Fill-In for an Automated Shift Manual Transmission in a Parallel Hybrid Electric Vehicle, 2002, IEEE, p. 1431-1436 (Year: 2002).*

* cited by examiner

TORQUE CONVERTER CLUTCH ENGAGEMENT PRESSURE

TECHNICAL FIELD

The present disclosure relates to torque converter clutch engagement pressure during braking events.

BACKGROUND

Regenerative braking is used on many hybrid and electric vehicles to generate electricity during braking events. During these events, torque is passed through the drivetrain to an electric generator. The drivetrain may include a fluid coupling or torque converter and a torque converter bypass clutch. The bypass clutch transfers torque more efficiently than the torque converter. The bypass clutch may be disengaged during particular vehicle events, reducing the efficiency of torque transfer and the electricity produced during regenerative braking.

SUMMARY

A vehicle may include a controller configured to, in response to an accelerator pedal release and an expected regenerative braking event, increase an engagement pressure of a torque converter clutch prior to occurrence of the event to a threshold that is based on a regenerative braking torque estimate associated with the event such that during the event, the clutch transfers substantially all of the torque estimated. The regenerative braking torque estimate may be based on a difference between an average road grade and a current road grade that may be derived from an elevation, current road grade, velocity of the vehicle, or combination thereof. The regenerative braking torque estimate may be based on a headway range and a rate of change thereof. The regenerative braking torque estimate may be based on a required or predicted deceleration rate and the vehicle speed.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
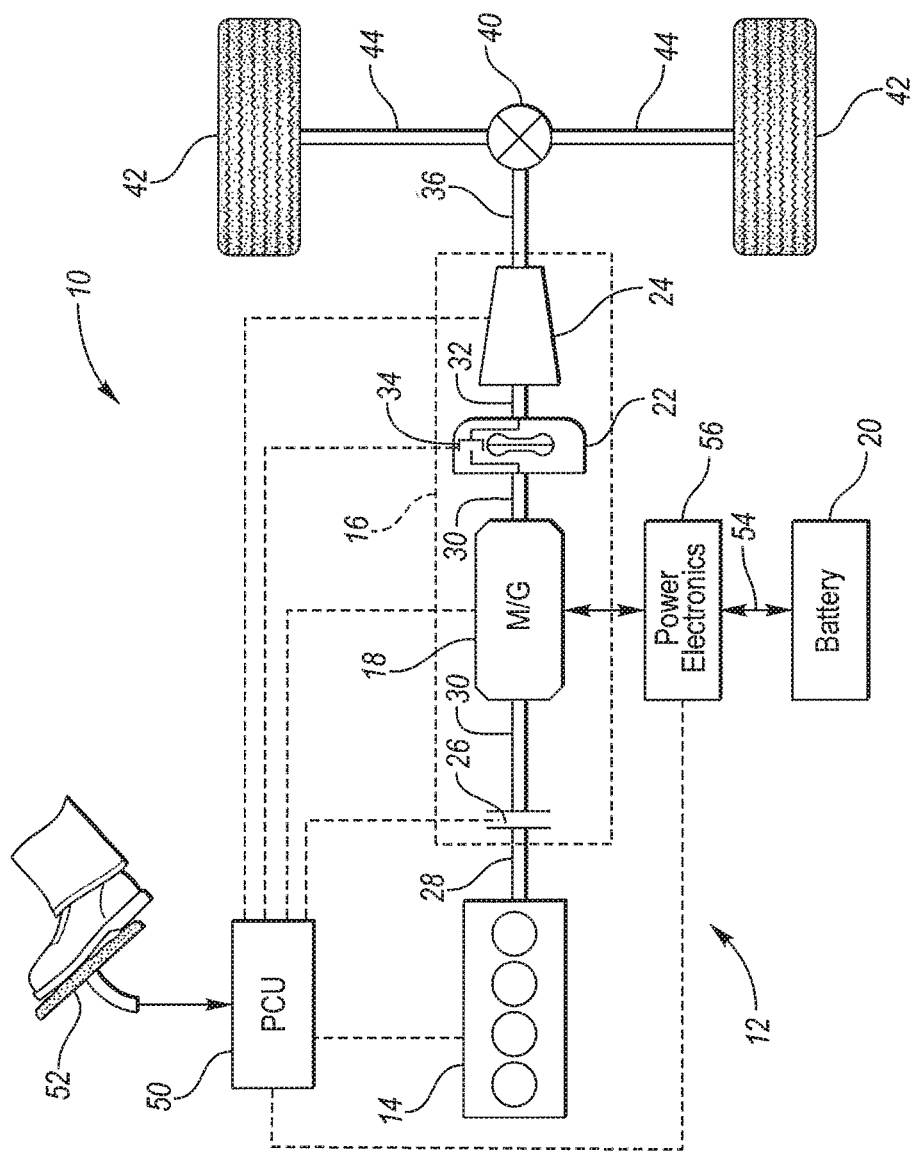
FIG. 1 is an overview of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences, such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions, such as starting/stopping engine 14, operating M/G 18 to provide wheel torque or charge battery 20, and to select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies, such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26, and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

The MHT implementation is well situated to provide regenerative braking through the drivetrain, as discussed above. Regenerative braking is a key feature utilized in the maximization of vehicle fuel economy. A regenerative braking event may begin with the release of the accelerator pedal 52. As the driver releases the accelerator pedal 52, the PCU 50 may begin to decrease the engagement pressure of the torque converter clutch 34 as the positive torque request decreases and the torque request may become negative. The TCC engagement pressure may reduce to a nominal value, as the vehicle begins to coast, or the engagement pressure may match the negative torque requested to produce lift pedal torque. The lift pedal torque may be the real or substitute engine friction brake torque. As the engagement pressure of the TCC 34 decreases, the capacity of the clutch 34 to transfer torque is decreased. A regenerative brake actuation would cause residual torque (i.e., torque demanded greater than the capacity of the clutch) to be fulfilled through the friction brakes,. The PCU may attempt to increase the engagement pressure of the clutch until the engagement pressure of the TCC 34 reaches a capacity capable of transferring the regenerative brake torque. Notable latency exists between the demand to change the engagement pressure and the engagement pressure realization of the desired capacity. Therefore, preemptively increasing the engagement pressure will ensure torque fulfillment by the clutch instead of the friction brakes. This allows regenerative braking to fulfill the torque demanded during the brake request. A controller, such as the PCU 50, may be configured to predict a braking event to prepare the torque converter clutch 34 for regenerative braking and prevent regenerative braking underutilization.

A controller may be configured to predict braking events to prepare the torque converter clutch 34 for regenerative braking. Various methods may be used for the prediction. The prediction algorithm may be rolling and continuous or initiated based on a trigger event. For example, the prediction algorithm may continuously update parameters used for the prediction. In another embodiment, the algorithm may predict a braking event based on a trigger (e.g., accelerator pedal lift or release).

A braking event may be predicted using road grade. Geographical information system (GIS) and global positioning systems (GPS) can identify the location of the vehicle and terrain. A comparison between the average road grade over a period and a current road grade may provide a prediction of a future regenerative braking event. The period may begin at $t_{start}$. An accelerator lift may initiate $t_{start}$. An accelerator pedal position value having a negative rate of change greater in magnitude than a threshold value may initiate $t_{start}$. For example, the period may initialize if the accelerator pedal is lifted by half in a short period of time.

The period may have a length of Δt, resulting in $t_{end} = t_{start} + \Delta t$. The period may be equal to the average execution time of a gear shift event. As shown in Equation 1, the current road grade, $\nabla_{cur}$, subtracted from the average road grade $\overline{\nabla}$, is compared with a threshold value, which may be –0.005. $\nabla_{cur}$ may be measured during the clock cycle preceding the $t_{start}$ clock cycle.

$$\overline{\nabla} - \nabla_{cur} < \text{threshold} \tag{1}$$

The threshold value may be set arbitrarily based on empirical data to meet performance demands. The threshold may also be a function of the current road grade. Meaning, threshold may change as the current road grade changes. The threshold value may also be adjusted based on the drivetrain drag constant (e.g., a coefficient based on vehicle rolling resistance and aerodynamic drag) For example, a regenerative braking event may not be predicted when the drivetrain drag constant is greater than the difference between the average road grade and the current road grade.

The road grade prediction method may also be implemented continuously. Instead of waiting for an accelerator pedal lift, the controller may continuously obtain road grade information for the anticipated vehicle route and calculate a rolling average. The continuous calculation may provide improved response times and set a regenerative brake prediction flag in the event that Equation 1 is satisfied. The rolling average may be calculated with $t_{start}$ being the current time. In another embodiment the rolling average may be calculated with $t_{start}$ being $$\frac{\Delta t}{2}$$

in the past. For example, if Δt is one second, $t_{start}$ would equal one half second in the past.

The road grade prediction method may predict more than a binary indication of a braking event. For example, the road grade prediction method may be used to estimate the negative torque of the braking event. The estimate may be used in combination with the binary indication to prepare the torque converter clutch, as described in further detail below. The road grade estimation method may be a function of the current road grade, elevation, velocity, or combination thereof of the vehicle and a difference between the average road grade and the current road grade. For example, a vehicle having a high elevation and traveling on a steep decline would require a generally stronger braking event than a vehicle having a low elevation and traveling on a gradual decline. Other factors may be taken into consideration to determine the negative braking torque (e.g., rolling resistance, weight, aerodynamic drag). The estimation may also be based on a lookup table that quantifies the road grade into an estimated brake torque based on a variety of factors. One of those factors may be the average torque estimate, which is based on the current road grade and the difference between the average road grade and the current road grade over Δt.

A braking event may be predicted using Adaptive Cruise Control (ACC). ACC is used in modern vehicles to set cruise control settings based on a platoon or group of vehicles. For example, the second car in a platoon may obtain cruise control parameters from a leading car by calculating the headway range and range rate. The distance to a preceding car may be measured using electromagnetic waves and optics (e.g., LiDAR, RADAR). This calculation provides an indication of the need to brake due to proximity to other vehicles. A brake prediction may be indicated based on the headway range. If the headway range is less than or equal to a predetermined threshold, the braking event is predicted.

If the headway range (x) is greater than the predetermined threshold, the controller may evaluate the headway range (x) and the rate of change $$\frac{dx}{dt},$$

of the headway range to make a prediction. The range rate may be predicted using a numerical method (e.g., moving average). The rate may be calculated over a period beginning at the accelerator lift or it may be a rolling rate. For example, the controller may calculate the range rate of change using a time window beginning one second before an accelerator pedal lift event and ending at the pedal accelerator lift event. The controller may then predict whether the brake pedal will be applied using Equation 2.

$$x + \left(\frac{dx}{dt}\right) * \Delta t \le \text{threshold} \tag{2}$$

where x is the headway range, $$\frac{dx}{dt}$$

is the rate of change of the headway range at time t or an average over a preceding range of times, and Δt is a extrapolation period to determine a headway range Δt in the future. The predicted headway range is compared with a threshold to predict a braking event.

A braking event may be predicted using vehicle-to-vehicle (V2V) or vehicle to infrastructure (V2I) communications, generally referred to as V2X. The V2X communications may be used in combination with the ACC methods. In addition, the V2X prediction may include traffic flow monitoring systems. For example, a braking event may be predicted based on proximity to traffic situations (e.g., congestion, accident). A vehicle approaching a grouping of standing traffic at 60 MPH would likely require braking, and therefore, an accurate prediction of a braking event is available. Any indication or modeling technology may be used to predict whether a braking event will take place. As another example, a vehicle fast approaching a traffic indicator or stop light at an intersection may receive indication of the indicator status to prompt prediction of a braking event prior to reaching the intersection. Other indication or modeling technologies may include, in combination or as a whole, the driver's past driving history, historical traffic data of the intended route of the trip, or speed limits of the route.

The ACC and V2X methods may predict more than a binary indication of a braking event. For example, the ACC and V2X methods may be used to estimate the negative torque of the braking event. The estimate may be used in combination with the binary indication to prepare the torque converter clutch, as described in further detail below. The methods may be a function of the headway range and the range rate. For example, a vehicle having a small headway range and a large rate of change would require a generally stronger braking torque than a vehicle having a large headway range and small rate of change. Other factors may be taken into consideration to determine the negative braking torque (e.g., rolling resistance, weight, aerodynamic drag). The V2X method may use vehicle speeds and road grade to estimate the negative torque of the braking event. For example, a vehicle having a high rate of speed and a negative road grade may require a higher braking torque than a vehicle having a slow speed and a flat road grade.

A combination of each of the aforementioned prediction and estimation methods may be used to either determine the braking event or braking event torque. For example, a decision making method may be used, along with a reliability value, to estimate the reliability of the braking event prediction and a decision process or algorithm may adjudicate the output to the prediction flag. For example, if the road grade and ACC methods determine a braking event is probable after an accelerator release event, but the V2X method does not, the system may evaluate the reliability of the data to determine the best prediction. The reliability of the information may be based on the distance between the threshold value and the input parameters. For example, $\nabla = \nabla_{cur} << -0.005$, resulting in highly reliable information.

A braking event may be predicted using any other method known to those with skill in the art or combination thereof. The prediction may occur based on a trigger event (e.g., accelerator pedal lift) or a continuous prediction may be used. The aforementioned methods correspond with a generally binary (e.g., ON, OFF) result. This result may be expanded to include non-binary, qualitative information, which may be used to set engagement pressure values as discussed later.

The torque converter clutch 34 may be prepared for a regenerative braking event based on the aforementioned braking event predictions. The torque converter clutch 34 may be locked or have a very small slip, which allows the torque converter clutch to transfer drivetrain torque based on the engagement pressure without substantial losses. The positive torque required for acceleration and speed maintenance may be less than the negative torque required for a regenerative braking event. Any excess torque not captured by the torque converter clutch is taken care of by the friction brakes. As an overly-simplified, specific example, a torque converter clutch during a regenerative braking event having an engagement pressure rated for 75 Nm of torque transfer would transfer 75 Nm of a 100 Nm drivetrain braking torque demand. The friction brakes would dissipate the remaining 25 Nm of torque In order to capture the 25 Nm torque lost to the friction brakes, the torque converter clutch is prepared for the braking event by increasing the engagement pressure of the torque converter clutch above the torque transfer threshold before the accelerator pedal event or a corresponding torque transfer threshold.

The regenerative brake torque estimate may diverge from the entire brake torque derived from the brake event because of limitations related to the power train. For example, or high voltage battery may be unable to accept all of the energy available from the vehicle deceleration. In addition, the electrical machine may be unable to manage all of the torque demanded from the regenerative event. Under the circumstances, the regenerative braking torque estimate may be equal to a portion of the entire brake torque as derived from the brake event.

In at least one embodiment, the engagement pressure may be increased to a previous engagement pressure associated with the positive torque required by accelerator pedal position. The engagement pressure may be increased to a level greater than or equal to the engagement pressure before the accelerator pedal change event. For example, the engagement pressure may have a corresponding torque converter clutch transfer of 75 Nm, which is equal to the positive torque required to maintain a particular vehicle speed. As the accelerator pedal is lifted, the PCU may decrease the engagement pressure. If a braking event is predicted—or the prediction flag is true—the PCU may increase the engagement pressure to the pressure before the accelerator pedal lift event. Meaning, the PCU would increase the engagement pressure to a pressure corresponding to a 75 Nm torque in anticipation of the regenerative braking event, allowing for all of the braking torque to be captured as regenerative braking instead of regenerative braking and friction braking.

The engagement pressure may be increased to a threshold related to a pressure corresponding to the previous pressure instead of the exact value. For example, the engagement pressure may be increased to a multiple of the previous pressure. Continuing with the example, the PCU may use a previous engagement pressure corresponding to a 75 Nm positive torque and increase the engagement pressure to a pressure corresponding to a 150 Nm negative torque in anticipation of the regenerative braking event. The increased pressure provides enhanced safety margin to ensure all of the braking energy is used to generate electricity. Although the given example doubles the torque transfer capability of the clutch, a different factor may be used to improve the regenerative braking energy obtained.

An algorithm may be used to determine the previous positive torque. For example, a five second window may be used to detect the previous positive torque. The controller may determine the maximum value of the previous engagement pressure window and use that to set the value for the engagement pressure before the braking event. The controller may use an average of the previous engagement pressure during the window before a drastic decline in the engagement pressure because the drastic decline indicates an intended release of the accelerator pedal. Various methods may be used to determine the previous engagement pressure value and are contemplated in this disclosure.

In response to a braking event prediction, the torque converter clutch engagement pressure may be increased based on the prediction estimates instead of the previous engagement pressure. In one embodiment, the previous engagement pressure may be used as a minimum threshold for the engagement pressure and an algorithm based on the prediction may estimate the probable negative torque required by the braking event.

As discussed above, the braking event prediction method may be used to estimate the negative torque required for the braking event. The estimate may be used to set a torque transfer threshold used by the controller to set a reference or desired value for the engagement pressure of the torque converter. This means the torque converter clutch engagement pressure may be increased to ensure the torque converter clutch 34 does not slip in response to higher negative braking torques based on a prediction of a braking event. Although the torque converter clutch may be prepared for a regenerative braking event under many circumstances, the vehicle accelerator pedal state may warrant checking of the braking event prediction status flag. After receiving indication that the prediction status flag is set, the controller may increase the torque converter clutch engagement pressure above an estimated negative torque threshold to prepare for a regenerative braking event.

Figure 2:
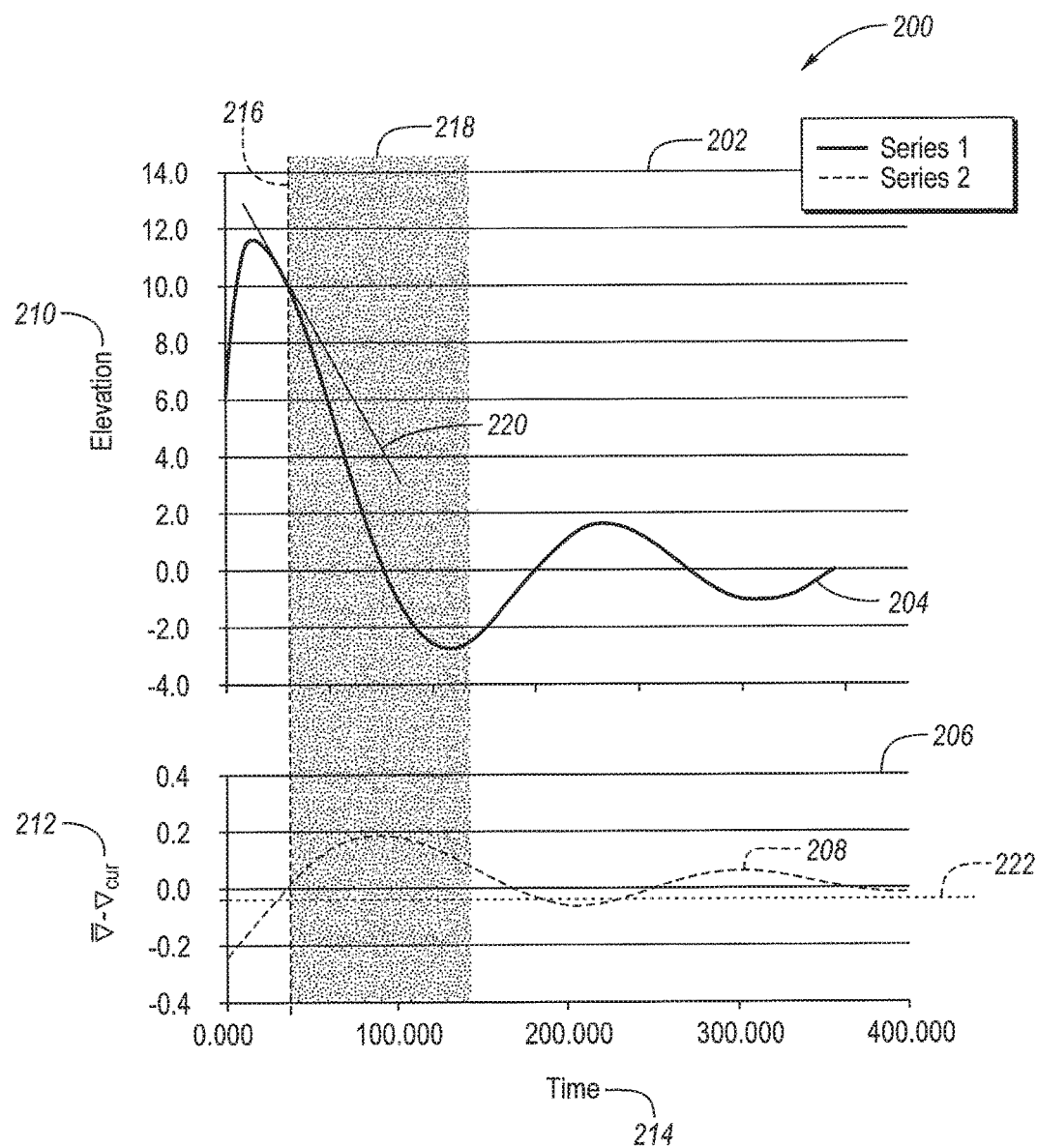
FIG. 2 is a graph indicating an elevation of a vehicle and a prediction of a braking event based on road grade.

Now referring to FIG. 2, a pair of graphs 200 is depicted. The first graph 202 includes an elevation curve 204. The second graph 206 includes a y=$\nabla$-$\nabla_{cur}$ curve 208. The first graph 202 has time 214 on the x-axis and elevation 210 on the y-axis. The curve follows a hypothetical elevation level of a vehicle. The curve may coincide with vehicle informatics used to provide GPS data. The second graph 206 indicates a curve equal to an average gradient over a particular look ahead window 218. The look ahead window 218 is shown as 90 seconds, but the look ahead window 218 could be a variety of time periods. For example, the look ahead window 218 could be 100 ms or three minutes. The window 218, as shown, begins at line 216 at around 18 seconds. The window 218 calculates the average value of the gradient or road grade. The average is continuously calculated. The average advances, providing curve 208, as time 214 progresses. The average may be calculated in response to release of the accelerator pedal as discussed above. When the curve 208 is greater than the threshold 222, the controller may set a prediction or estimation for a braking event flag as true.

Figure 3:
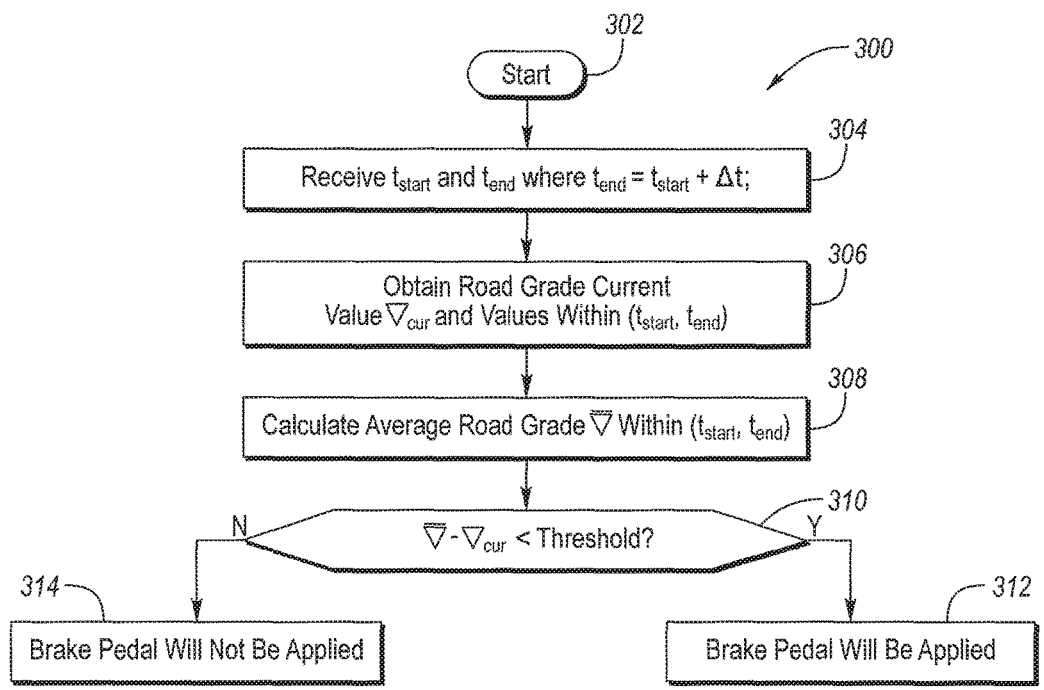
FIG. 3 is a flow diagram of a braking event prediction method based on road grade.

Now referring to FIG. 3, a flow diagram 300 is shown having a start 302. In step 304, the controller may receive $t_{start}$. An accelerator lift may initiate $t_{start}$. The period may have a length of $\Delta t$, resulting in $t_{end}=t_{start}+\Delta t$. In step 306, the controller obtains values for $\nabla_{cur}$ and all of the $\nabla$ values between $t_{start}$ and $t_{end}$. In step 308, the controller may calculate the average road grade $\nabla$, using all of the $\nabla$ values between $t_{start}$ and $t_{end}$. In step 310, the controller may compare the difference between $\nabla$ and $\nabla_{cur}$ and compare the result with a threshold value. If the difference is less than the threshold, the brake pedal prediction flag is set to true in step 312. If the difference is greater than the threshold, the brake pedal prediction flag is set to false in step 314.

Figure 4:
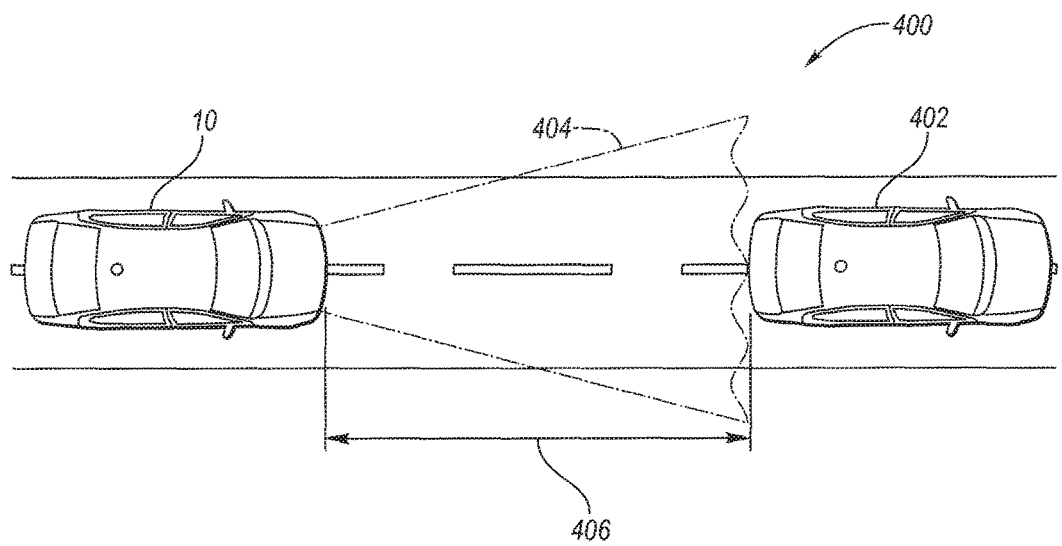
FIG. 4 depicts a brake prediction method using LiDAR or RADAR to measure a headway range.

Now referring to FIG. 4, a representation of an ACC braking event prediction 400 method is shown. A vehicle 10 transmits a LiDAR or RADAR signal 404. The preceding vehicle 402 reflects the signal. The vehicle 10 may use the returned signal to calculate a headway range 406. The headway range 406 may change if the speeds of the vehicles 10, 402 are different. The rate of change of the headway range 406 may be computed and stored in a register of one or both vehicles 10, 402.

Figure 5:
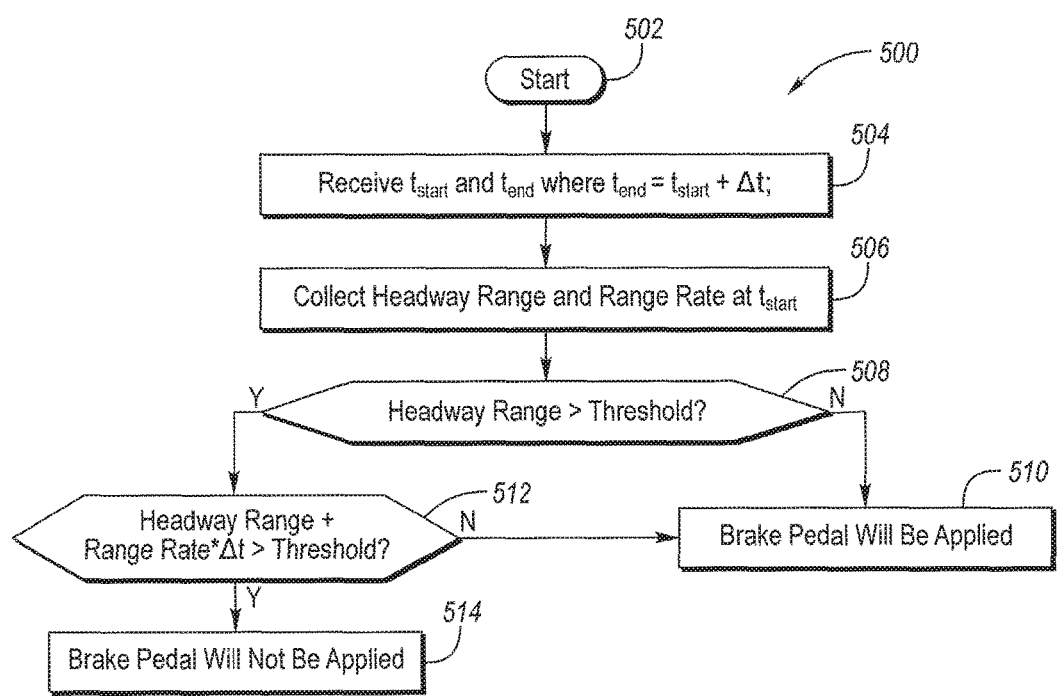
FIG. 5 is a flow diagram of a braking event prediction method based on headway range.

Now referring to FIG. 5, a flow diagram 500 is shown having a start 502. In step 504, the controller may receive $t_{start}$. An accelerator lift may initiate $t_{start}$. The period may have a length of $\Delta t$, resulting in $t_{end}=t_{start}+\Delta t$. In step 506, the controller calculates the initial headway range and range rate. In step 508, the controller compares the headway range with a threshold. If the headway range is not greater than the threshold, the brake pedal prediction flag is set to true in step 510. If the headway range is greater than the threshold, the controller may compare a combination of the headway range and range rate with the threshold in step 512. If a summation of the headway range and a product of the range rate and $\Delta t$ are not greater than the threshold, the controller will set the brake prediction flag to true in step 510. If a summation of the headway range and a product of the range rate and $\Delta t$ are greater than the threshold, the controller will set the brake prediction flag to false in step 514.

Figure 6:
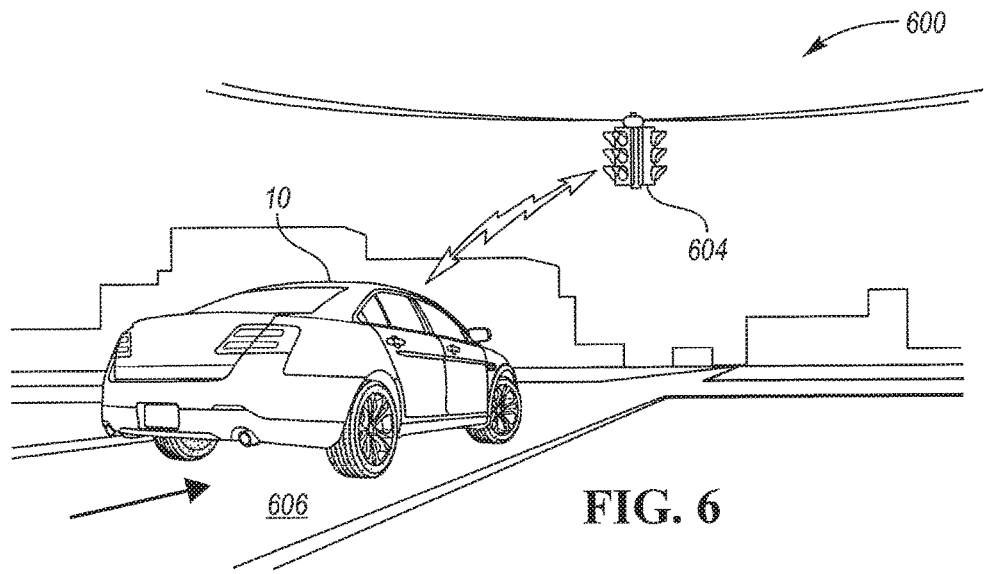
FIG. 6 depicts a brake prediction method using V2V, V2I, or V2X.

Now referring to FIG. 6, a V2X brake pedal prediction situation 600 is shown. The figure indicates that a vehicle 10 is approaching a V2I transmitter 604. The V2I transmitter 604 may be a traffic light or other traffic indicator. The V2I transmitter 604 and the vehicle may collectively determine the required brake initiation time in order for the vehicle 10 to stop before reaching the V2I transmitter 604. This communication would allow the controller to predict a braking event based on the proximity of the vehicle 10 to the V2I transmitter 604.

Figure 7:
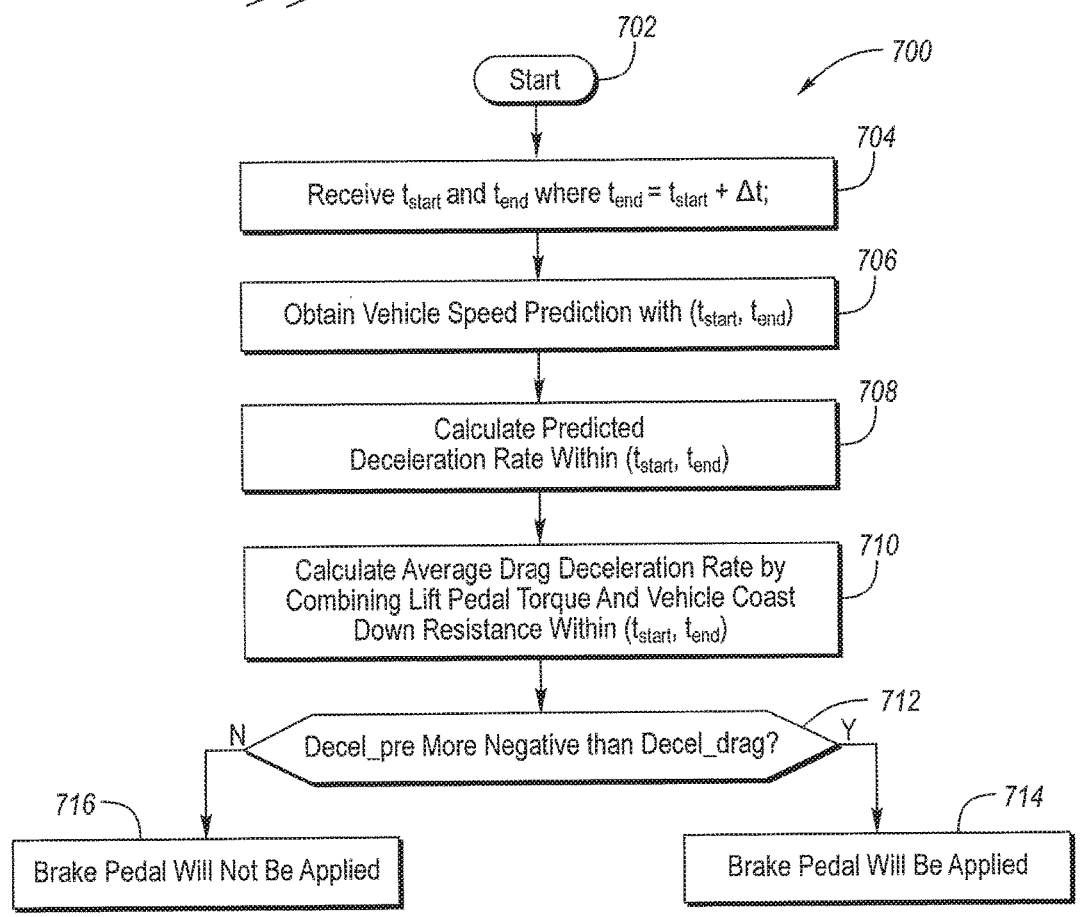
FIG. 7 is a flow diagram of a braking event prediction method based on vehicle to infrastructure communications.

Now referring to FIG. 7, a flow diagram 700 is shown having a start 702. In step 704, the controller may receive $t_{start}$. An accelerator lift may initiate $t_{start}$. The period may have a length of $\Delta t$, resulting in $t_{end}=t_{start}+\Delta t$. In step 706, the vehicle speed is predicted with $t_{start}$ and $t_{end}$ using a linear representation. For example, if the vehicle speed must reach zero within the distance between the vehicle and the V2I transmitter, the controller will anticipate a linear slope to reach zero in the given distance. The vehicle speed may be predicted with a more complex method as well, which may include other sources of information available to the vehicle controller, as described above. In step 708, the predicted deceleration rate ($Decel_{Pre}$) to stop in the allotted distance, as discussed in step 706, is calculated. In step 710, the average deceleration rate is calculated. The average deceleration rate ($Decel_{DRAG}$) may be calculated by combining the vehicle coast down resistance and lift pedal negative torque. The vehicle coast down may include the tire rolling resistance, aerodynamic drag, and other factors. The lift pedal torque may be the real or substitute engine friction brake torque. In step 712, the controller compares the average deceleration rate and the predicted deceleration rate to stop before the V2I device. In other words, if the negative torque from the drivetrain will slow the vehicle to the required speed, a braking event is not predicted because the drivetrain is likely to be used to slow the vehicle. In step 714, if the brake pedal will be applied the brake pedal prediction flag is set. In step 716, if the brake pedal will not be applied, the brake pedal prediction flag is not set.

Figure 8:
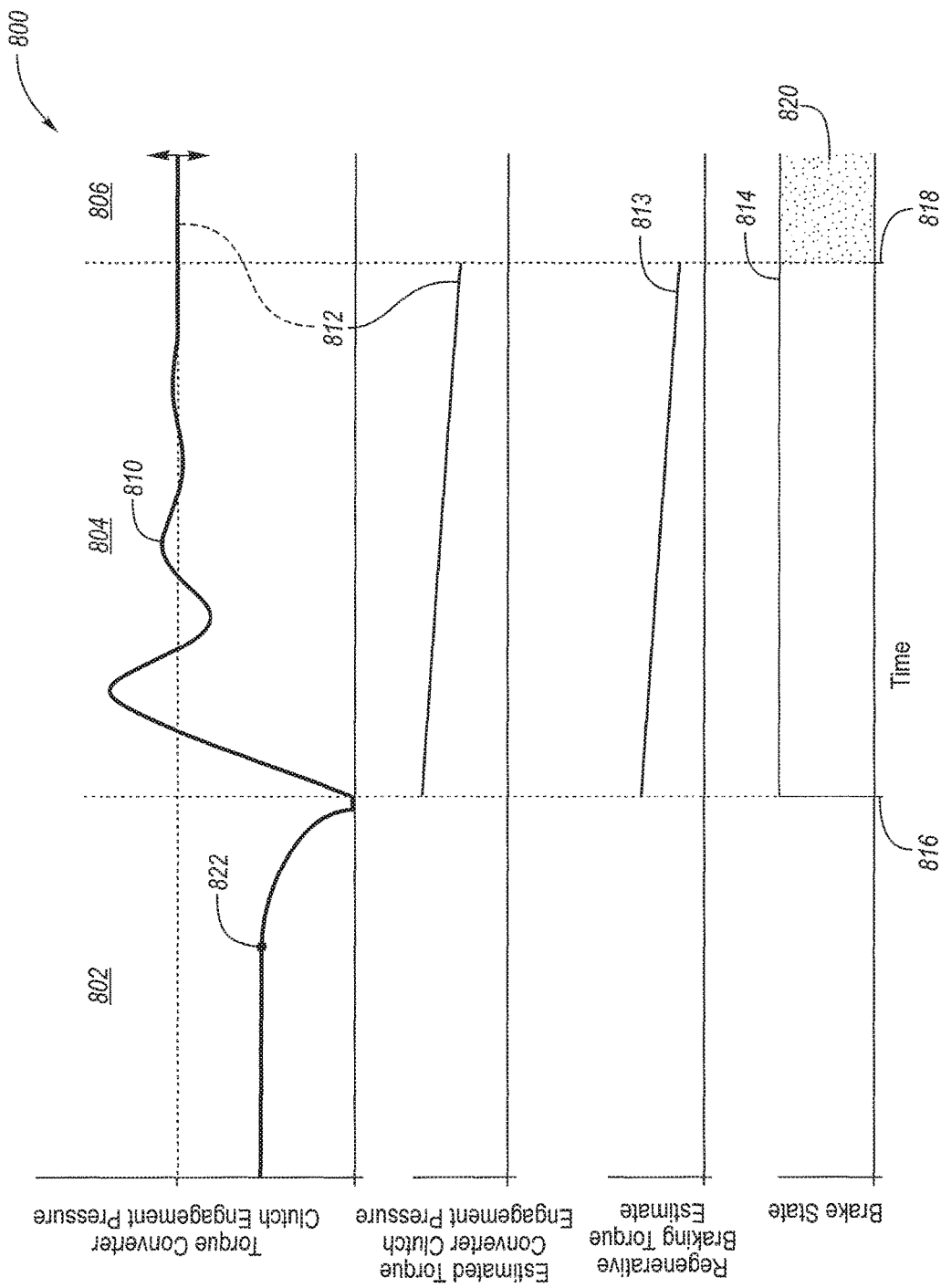
FIG. 8 is a composite graph that depicts a torque converter clutch engagement pressure, an estimated brake torque engagement pressure, and brake state.

Now referring to FIG. 8, a composite sequence graph 800 is shown. The graph has four horizontal sections depicting the torque converter clutch engage pressure, the anticipated brake torque magnitude, and the brake prediction and state. The graph has three vertical sections depicting different transition periods in the vehicle drivetrain. Section 802 depicts the period during the accelerator pedal lift. As shown in the torque converter clutch engage pressure section, the torque converter clutch engagement pressure curve 810 is constant, which corresponds to a constant torque required to maintain a speed profile selected by the driver of the vehicle. Curve 810 begins to decrease as the pedal lift event 822 transpires. Curve 810 may eventually decrease to zero or a nominal value indicating that the torque converter engagement pressure has decreased to zero or a nominal value. The torque converter clutch engagement pressure may only approach zero and never reach zero. The beginning of the pedal release may trigger one of the aforementioned methods to predict a braking event, or the controller may read the prediction flag to determine if a braking event is anticipated. The regenerative braking event prediction flag is read at time 816 on the brake prediction flag curve 814. If the brake prediction flag is set, the estimated torque converter clutch engagement pressure curve 812 is calculated. The estimated torque converter clutch engagement pressure curve 812 is derived, using a numerical relationship, to the regenerative braking torque estimate curve 813. Section 804 depicts the period of increasing the engagement pressure to meet an estimated magnitude of brake torque. The estimated brake torque may vary during the section 804 period. In section 804, the controller attempts to match the torque converter engagement pressure, curve 810, with the estimated torque converter engagement pressure, curve 812. The estimated brake torque engagement pressure may vary, as shown on the downward slope of curve 812. The estimated engagement pressure may be used as a set point for the torque converter clutch engagement pressure feedback loop. The estimated engagement pressure may be used as a feedforward value as well. Section 806 depicts the period when the passenger requests a vehicle brake. The torque converter clutch engagement pressure curve 810 decreases as the vehicle slows. In other embodiments, the torque converter clutch engagement pressure curve 810 does not decrease to zero as the vehicle slows depending on variance between the predicted brake torque and the actual brake torque. The shaded region 820 indicates that the brake prediction curve 814 was fulfilled.

Figure 9:
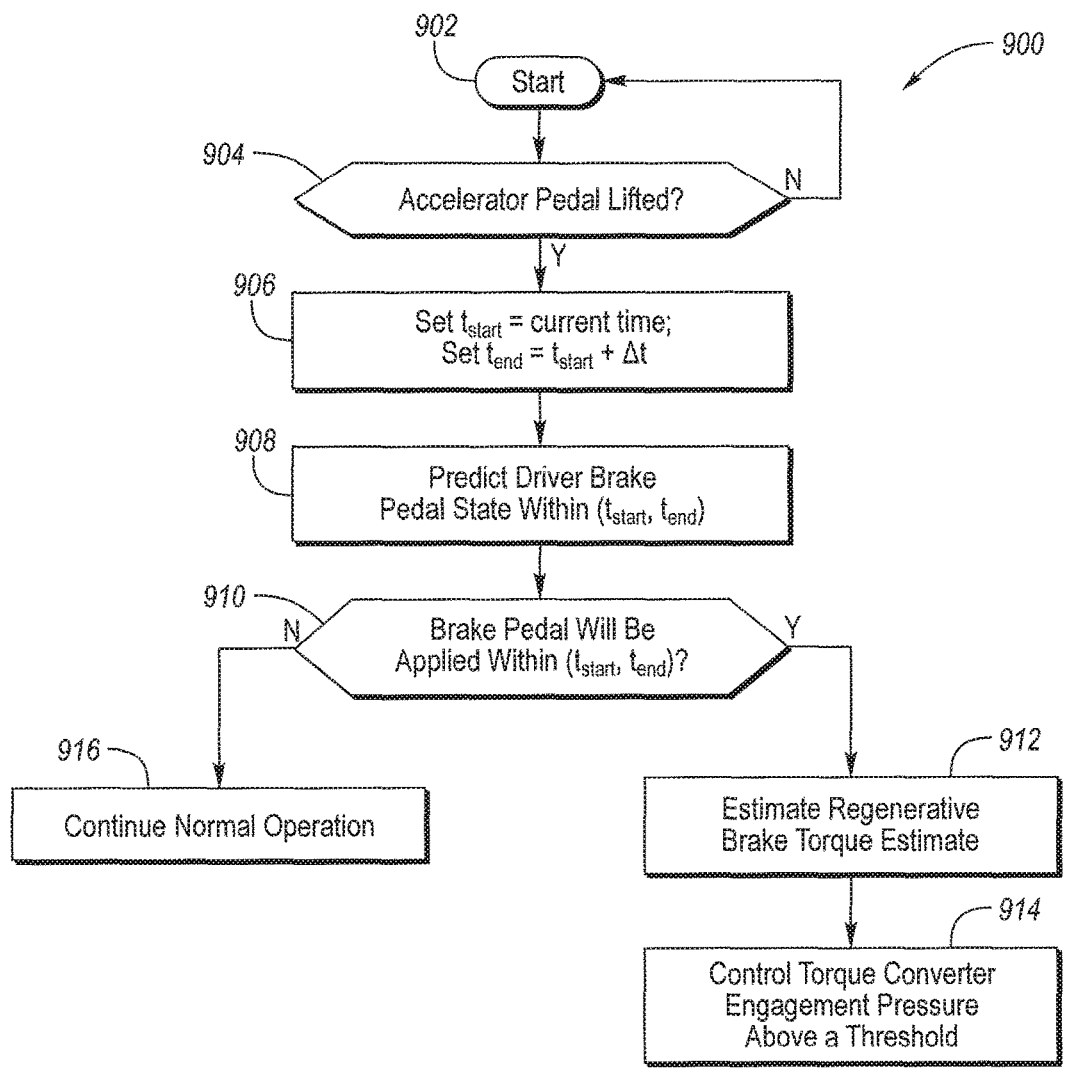
FIG. 9 is a flow diagram of a torque converter clutch engagement pressure control strategy to maximize regenerative torque received by the generator.

Now referring to FIG. 9, a flow diagram 900 is depicted having a start 902. In response to a pedal lift in step 904, the process continues. In step 906, the controller may receive $t_{start}$. An accelerator lift may initiate $t_{start}$. The period may have a length of $\Delta t$, resulting in $t_{end} = t_{start} + \Delta t$. In step 908, the braking event prediction flag is read. In step 910, the prediction is analyzed to determine whether the braking event may occur within the given period. If the braking event prediction flag is not enabled or not within the window then the controller may continue normal operation in step 916. If the braking event prediction flag is enabled and within the window, the controller may estimate the regenerative brake torque estimate in step 912, and increase the torque converter engagement pressure above a threshold in step 914. In another embodiment, the torque converter engagement pressure may be increased above the estimated threshold.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a controller configured to, in response to accelerator pedal release and an expected regenerative braking event, increase an engagement pressure of a torque converter clutch prior to occurrence of the event to a threshold that is based on a regenerative braking torque estimate associated with the event such that during the event, the clutch transfers more torque than the converter.

2. The vehicle of claim 1, wherein the regenerative braking torque estimate is based on a difference between an average road grade and a current road grade.

3. The vehicle of claim 1, wherein the regenerative braking torque estimate is based on a headway range and a rate of change thereof.

4. The vehicle of claim 1, wherein the regenerative braking torque estimate is based on a predicted deceleration rate.

5. The vehicle of claim 1, wherein presence of the expected regenerative braking event arises from a difference between an average road grade and a current road grade.

6. The vehicle of claim 5, wherein a duration associated with the average road grade begins with the accelerator pedal release.

7. The vehicle of claim 1, wherein presence of the expected regenerative braking event arises from an adaptive cruise control headway range.

8. The vehicle of claim 7, wherein presence of the expected regenerative braking event further arises from a rate of change of the adaptive cruise control headway range.

9. The vehicle of claim 1, wherein presence of the expected regenerative braking event arises from a predicted deceleration rate.

10. The vehicle of claim 9, wherein presence of the expected regenerative braking event further arises from a difference between the average deceleration rate and the predicted deceleration rate.

11. A vehicle comprising:
a torque converter having a bypass clutch; and
a controller configured to, in response to accelerator pedal release and a predicted regenerative braking event, increase an engagement pressure of a torque converter clutch prior to occurrence of the event to a threshold that is based on a regenerative braking torque prediction associated with the event such that during a portion of the event, the clutch transfers all torque associated with the event.

12. The vehicle of claim 11, wherein the regenerative braking torque prediction is based on a current velocity of the vehicle and a difference between an average road grade and a current road grade.

13. The vehicle of claim 11, wherein the regenerative braking torque prediction is based on a headway range and a rate of change thereof.

14. The vehicle of claim 11, wherein the regenerative braking torque prediction is based on a predicted deceleration rate.

15. The vehicle of claim 11, wherein presence of the predicted regenerative braking event arises from a difference between an average road grade and a current road grade.

16. The vehicle of claim 15, wherein a duration associated with the average road grade begins with the accelerator pedal release.

17. The vehicle of claim 11, wherein presence of the predicted regenerative braking event arises from an adaptive cruise control headway range.

18. The vehicle of claim 17, wherein presence of the predicted regenerative braking event further arises from a rate of change of the adaptive cruise control headway range.

19. The vehicle of claim 11, wherein presence of the predicted regenerative braking event arises from a predicted deceleration rate.

20. A method comprising:
in response to an accelerator pedal release, increasing, by a controller, an engagement pressure of a torque converter clutch prior to occurrence of an expected regenerative braking event to a threshold that is based on a regenerative braking torque estimate associated with the event.

* * * * *